(12) United States Patent
Hwang (10) Patent No.: US 9,081,576 B2
(45) Date of Patent: Jul. 14, 2015

(54) TASK SCHEDULING METHOD OF A SEMICONDUCTOR DEVICE BASED ON POWER LEVELS OF IN-QUEUE TASKS

(75) Inventor: Joo-young Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 429 days.

(21) Appl. No.: 13/561,367

(22) Filed: Jul. 30, 2012

(65) Prior Publication Data

US 2013/0047004 A1 Feb. 21, 2013

(30) Foreign Application Priority Data

Aug. 19, 2011 (KR) .................. 10-2011-0083049

(51) Int. Cl.
*G06F 1/26* (2006.01)
*G06F 1/32* (2006.01)
*G06F 9/50* (2006.01)

(52) U.S. Cl.
CPC .............. *G06F 1/329* (2013.01); *G06F 9/5094* (2013.01); *Y02B 60/142* (2013.01); *Y02B 60/144* (2013.01)

(58) Field of Classification Search
CPC ................................ G06F 1/329; G06F 9/5094

USPC ........................................... 713/300; 718/104
See application file for complete search history.

(56) References Cited

U.S. PATENT DOCUMENTS 8,752,060 B2 * 6/2014 Hsieh et al. ................... 718/104
2008/0301474 A1 * 12/2008 Bussa et al. ................... 713/300

FOREIGN PATENT DOCUMENTS

| JP | 2002-099433 | 4/2002 |
| JP | 2009-146243 | 7/2009 |
| KR | 1020080024681 | 3/2008 |
| KR | 1020100026989 | 3/2010 |

* cited by examiner

*Primary Examiner* — Albert Wang
(74) *Attorney, Agent, or Firm* — F. Chau & Associates, LLC (57) ABSTRACT

A task scheduling method of a semiconductor device, the method including: determining whether a power level of a first queue task disposed in a first queue and a power level of a first core task are the same as each other, wherein the first queue task is to be processed by a first core after the first core task; and in response to the power level of the first queue task and the power level of the first core task being different, moving the first queue task to a second queue, wherein the second queue corresponds to a second core that processes a second core task having the same power level as that of the first queue task.

16 Claims, 10 Drawing Sheets

TASK SCHEDULING METHOD OF A SEMICONDUCTOR DEVICE BASED ON POWER LEVELS OF IN-QUEUE TASKS

CROSS-REFERENCE TO RELATED APPLICATION

This application claims priority under 35 U.S.C. §119 to Korean Patent Application No. 10-2011-0083049, filed on Aug. 19, 2011, in the Korean Intellectual Property Office, the disclosure of which is incorporated by reference herein in its entirety.

BACKGROUND

1. Technical Field

The inventive concept relates to a task scheduling method of a semiconductor device, and more particularly, to a task scheduling method of a semiconductor device that satisfies real-time processing of a task and minimizes power consumption.

2. Discussion of the Related Art

As semiconductor device technologies have been developed, real-time processing of a task is required in certain applications. Moreover, as mobile semiconductor devices have become more prevalent, efforts have been made to develop semiconductor devices capable of real-time processing of a task and reduced power consumption.

SUMMARY

An exemplary embodiment of the inventive concept provides a task scheduling method of a semiconductor device that satisfies real-time processing of a task and minimizes power consumption.

According to an exemplary embodiment of the inventive concept, there is provided a task scheduling method of a semiconductor device, the method including: determining whether a power level of a first queue task disposed in a first queue and a power level of a first core task are the same as each other, wherein the first queue task is to be processed by a first core after the first core task; and in response to the power level of the first queue task and the power level of the first core task being different, moving the first queue task to a second queue, wherein the second queue corresponds to a second core that processes a second core task having the same power level as that of the first queue task.

The first queue task is moved to the second queue in response to a determination that the first queue task satisfies a deadline for the first queue task when the second core processes the second core task and then the first queue task.

The method may further include: in response to a determination that the first queue task does not satisfy a deadline for the first queue task when the second core processes the second core task and then the first queue task, changing an operating voltage of the first core from the power level of the first core task to the power level of the first queue task by dynamic voltage frequency scaling (DVFS).

The first queue task may be disposed at the head of the first queue.

A power level of the second queue task disposed in the second queue may be the same as the power level of the first core task.

The method may further include: moving the second queue task to the first queue.

The second queue task is moved to the first queue in response to a determination that the second queue task satisfies a deadline for the second queue task when the first core processes the first core task and then the second queue task.

The method may further include: selecting the second core from among a plurality of cores included in the semiconductor device, in response to a determination that the second core task and the first queue task have the same power level.

The method may further include changing the power level of the first queue task to be different from the power level of the first core task by increasing a processing time of the first queue task based on a slack time, wherein the slack time is a difference between a processing time scheduled for the first core task and the actual time taken to process the first core task.

The semiconductor device may be included in a mobile device or a server.

According to an exemplary embodiment of the inventive concept, there is provided a task scheduling method of a semiconductor device including a first core and a second core, the method including: allocating a first task to be processed by the first core and a second task to be processed by the second core, wherein the first and second cores operate at different power levels; and in response to a determination that a power level of the first task is the same as the power level of the second core and a power level of the second task is the same as the power level of the first core, swapping the first and second tasks so that the first task is to be processed by the second core and the second task is to be processed by the first core.

The first and second tasks are swapped in response to a determination that deadlines for the first and second tasks are satisfied by the second and first cores, respectively.

A holding operation may not be performed by the first and second cores when the first and second tasks are swapped, wherein the holding operation occurs when operating voltages of the first core and the second core are changed to match a power level of the originally allocated tasks.

The method may further include: not swapping the first and second tasks in response to a determination that the deadlines for the first and second tasks are not satisfied by the second and first cores, respectively, and changing the operating voltages of the first core and the second core by DVFS.

The semiconductor device may further include: a first queue for storing the task to be processed by the first core; and a second queue for storing the task to be processed by the second core.

According to an exemplary embodiment of the inventive concept, there is provided a task scheduling method of a semiconductor device, the method including: determining if a power level of a first task disposed in a first queue is the same as an operating voltage of a first core; and in response to determination that the power level of the first task and the operating voltage of the first core are different, preventing the operating voltage of the first core from changing.

The operating voltage of the first core is prevented from being changed by moving the first task into a second queue of a second core.

An operating voltage of the second core is the same as the power level of the first task.

The first task is moved into the second queue in response to a determination that a deadline of the first task will be satisfied by the second core.

The method may further include moving a second task from the second queue to the first queue, in response to a determination that a power level of the second task is the same as the operating voltage of the first core.

BRIEF DESCRIPTION OF THE DRAWINGS

The above and other features of the inventive concept will become more apparent by describing in detail exemplary embodiments thereof with reference to the accompanying drawings in which.

DETAILED DESCRIPTION OF THE EMBODIMENTS

Hereinafter, exemplary embodiments of the inventive concept will be described in detail with reference to the accompanying drawings. This inventive concept may, however, be embodied in different forms and should not be construed as limited to the embodiments set forth herein.

As used herein, the singular forms "a," "an" and "the" are intended to include the plural forms as well, unless the context clearly indicates otherwise.

Figure 1:
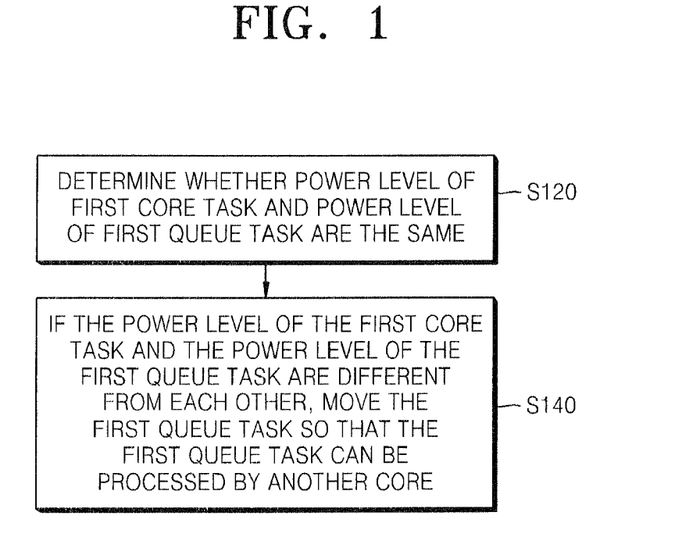
FIG. 1 is a flowchart of a task scheduling method according to an exemplary embodiment of the inventive concept.
Figure 2:
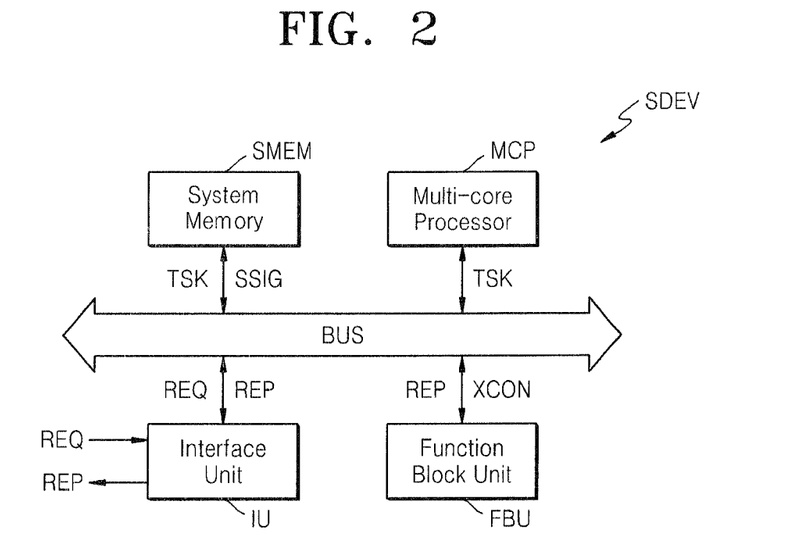
FIG. 2 is a diagram of a semiconductor device that processes a task using the task scheduling method of FIG. 1.

FIG. 1 is a flowchart of a task scheduling method according to an exemplary embodiment of the inventive concept. FIG. 2 is a diagram of a semiconductor device SDEV that processes a task using the task scheduling method of FIG. 1.

Referring to FIGS. 1 and 2, the task scheduling method includes determining whether power levels of a first core task CTSK1 and a first queue task QTSK1 are the same (operation S120), and moving the first queue task QTSK1 such that the first queue task QTSK1 can be processed by another core if the power levels of the first core task CTSK1 and the first queue task QTSK1 are different from each other (operation S140). The semiconductor device SDEV of the present embodiment includes a function block unit FBU, an interface unit IU, a multi-core processor MCP, and a system memory SMEM that are connected to a bus BUS. In this regard, the function block unit FBU, the interface unit IU, the multi-core processor MCP, and the system memory SMEM may be connected to one of a plurality of buses or may be simultaneously connected to the plurality of buses.

The function block unit FBU may include at least one function block (not shown) that performs an operation corresponding to a request REQ received from the interface unit IU. The request REQ received from the interface unit IU may be transmitted from a host device (not shown) or from a user through an input and output device (not shown). A result REP obtained by the function block unit FBU may be transmitted to the outside through the interface unit IU.

The multi-core processor MCP generates a control signal XCON used to control the function block unit FBU to perform the operation corresponding to the request REQ. For example, when the function block unit FBU includes a flash memory (not shown) that may store data, the multi-core processor MCP may control the flash memory using the control signal XCON (for example, a physical address) according to address mapping, etc. corresponding to a program command transmitted from the outside (for example, the host device) in response to the program command.

The multi-core processor MCP processes a control operation in a task unit TSK. The task TSK that is to be processed by the multi-core processor MCP is loaded onto the system memory SMEM. The system memory SMEM may be a dynamic random access memory (DRAM) or a static random access memory (SRAM). However, the inventive concept is not limited thereto, and the system memory SMEM may be a non-volatile memory like a phase-change random access memory (PRAM).

An operating system (not shown) that operates the multi-core processor MCP may be loaded onto the system memory SMEM. The operating system loaded onto the system memory SMEM may be used to schedule the task TSK processed by the multi-core processor MCP. The operating system may transmit a task scheduling signal SSIG regarding scheduling of the task TSK to the multi-core processor MCP. The task scheduling signal SSIG may include information regarding a core among cores included in the multi-core processor MCP to be used to process the task TSK, a speed or a power level used to process the task TSK, or a task processing sequence.

The information included in the task scheduling signal SSIG may vary periodically or not periodically corresponding to an operating speed or power consumption amount necessary for the multi-core processor MCP. For descriptive convenience, task scheduling at a first point may hereinafter be referred to as first scheduling, and task scheduling at a second point where information included in the first scheduling changes may hereinafter be referred to as second scheduling.

Figure 3:
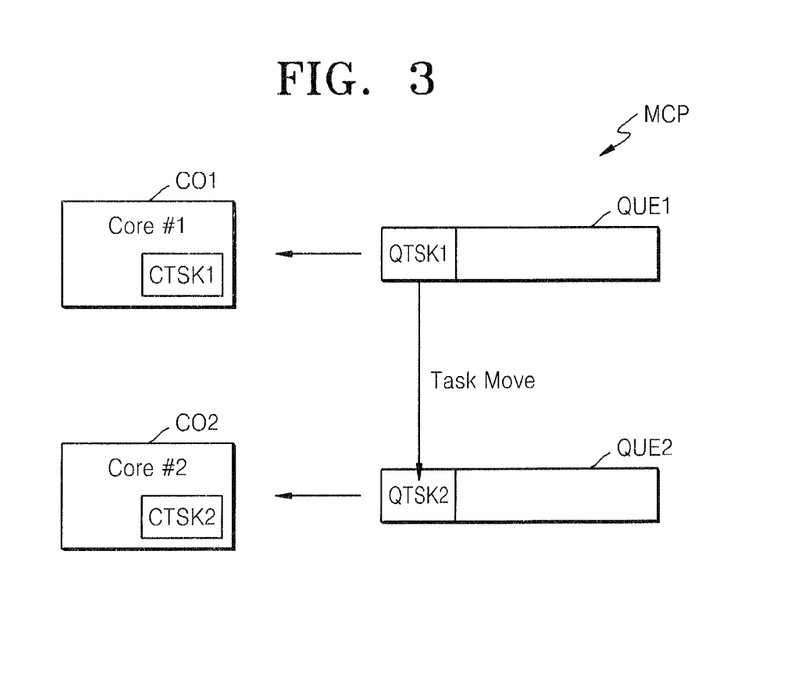
FIG. 3 is a diagram of a multi-core processor of FIG. 2.

The multi-core processor MCP processes the task TSK in response to the task scheduling signal SSIG. Referring to FIG. 3, the multi-core processor MCP may include a first core C01 and a second core C02. The multi-core processor MCP may further include a first queue QUE1 that stores the first queue task QTSK1 that is first scheduled to be processed by the first core C01, and a second queue QUE2 that stores a second queue task QTSK2 that is first scheduled to be processed by the second core C02. The first queue QUE1 and the second queue QUE2 may be included in caches of the first core C01 and the second core C02, respectively.

In FIG. 3, the first core C01 performs a first core task CTSK1 when the first queue task QTSK1 is disposed at the head of the first queue QUE1, and the second core C02 performs a second core task CTSK2 when the second queue task QTSK2 is disposed at the head of the second queue QUE2. Task scheduling will now be described when each queue task is disposed at a head of its queue. However, the inventive concept is not limited thereto, and task scheduling may be performed when each queue task is disposed at another position of its queue.

Referring to FIGS. 2 and 3, as described above, the first core task CTSK1, the second core task CTSK2, the first queue task QTSK1, and the second queue task QTSK2 may be processed by the first core C01 or the second core C02 using one of power levels PL1~PLn shown in FIG. 4(a). Each of the first core task CTSK1, the second core task CTSK2, the first queue task QTSK1, and the second queue task QTSK2 may be set to have one of the power levels PL1~PLn. The task scheduling signal SSIG may include information regarding a power level of each of the first core task CTSK1, the second core task CTSK2, the first queue task QTSK1, and the second queue task QTSK2 as described above.

Setting each of the first core task CTSK1, the second core task CTSK2, the first queue task QTSK1, and the second queue task QTSK2 to have one of the power levels PL1~PLn is done to optimize the power consumption of the multi-core processor MCP according to processing statuses of the first core task CTSK1, the second core task CTSK2, the first queue task QTSK1, and the second queue task QTSK2. For example, as shown in FIGS. 4(b) and (c), the power consumption of the multi-core processor MCP may be reduced by processing the task TSK (in which a deadline is set at 50 ns) at the low power level PL1 for a time of 40 ns rather than by processing the task TSK at the high power level PL2 for a time of 20 ns.

A reduction in the power consumption of the multi-core processor MCP with respect to a change in power levels of tasks will now be described in more detail. The semiconductor device SDEV of the present embodiment includes the multi-core processor MCP as described above. Although an operating speed of a processor is continuously enhanced, a continuous increase in the calculation performance of the processor is limited. In particular, the multi-core processor MCP may be used by an embedded device that exhibits high performance at low power or by a server that exhibits high performance at low heating. Thus, the reduction in the power consumption of the multi-core processor MCP is a consideration.

Power generated by a CMOS-based multi-core processor MCP may be divided into dynamic switching power, leakage power, and short power. The dynamic switching power, which is caused by a capacitance of an output node when logic values 0 and 1 of a CMOS circuit are switched, occupies a major portion of the whole power consumption of the multi-core processor MCP. Thus, the dynamic switching power may be minimized.

The dynamic switching power P is in proportion to the square of a dynamic voltage V, a dynamic frequency f, and a task processing time t, as given by equation 1 below.

$$P = V^2 f t \quad \text{[Equation 1]}$$

Therefore, at least one of the dynamic voltage V, the dynamic frequency f, and the task processing time t must be reduced to reduce the dynamic switching power P. However, if the frequency f is merely reduced, since the dynamic switching power P increases in proportion to the frequency f when the task processing time t is reduced, the dynamic switching power P consumed to perform the whole task does not greatly change. If the dynamic voltage V is reduced, the dynamic switching power P does not increase in proportion to the dynamic voltage V when the task processing time t is reduced, and thus the dynamic switching power P consumed to perform the whole task may be reduced. Thus, the dynamic voltage V of the multi-core processor MCP may be reduced.

Dynamic voltage frequency scaling (DVFS) may be supported to reduce the power consumption amount by reducing the dynamic voltage V of the multi-core processor MCP. DVFS may be used to dynamically change voltages (e.g., power levels of tasks) of the first core C01 and the second core C02 when the first core C01 and the second core C02 operate. In other words, the power level PL2 of FIG. 4(b) is changed to the power level PL1 of FIG. 4(c) during operations of the first core C01 and the second core C02, and thus the power consumption of the multi-core processor MCP may be reduced. A frequency is generally changed in accordance with a voltage change.

Figure 5:
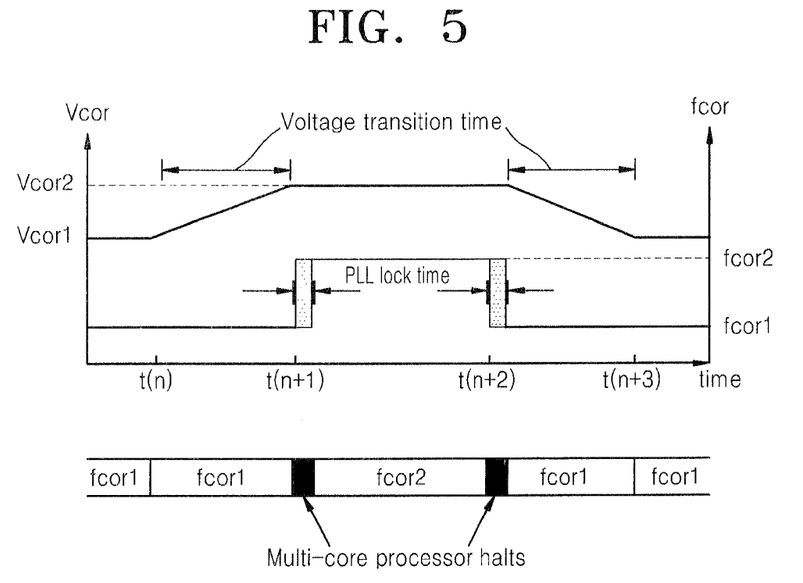
FIG. 5 is a diagram for explaining dynamic voltage frequency scaling (DVFS) performed by a phase locked loop (PLL)

A change in the voltage or frequency of the first core C01 and the second core C02 using DVFS may be made by a phase locked loop (PLL) (not shown) that generates a clock (not shown) that is applied to the multi-core processor MCP as shown in FIG. 5. Referring to FIG. 5, a voltage level changes from a first voltage Vcor1 to a second voltage Vcor2 or from the second voltage Vcor2 to the first voltage Vcor1. Accordingly, a frequency level is changed from a first frequency fcor1 to a second frequency fcor2 or from the second frequency fcor2 to the first frequency fcor1.

The PLL is used to fix the first frequency fcor1 and the second frequency fcor2 of the first core C01 and the second core C02 in a section where the first voltage Vcor1 and the second voltage Vcor2 of the first core C01 and the second core C02 change. Thus, as shown in FIG. 5, the multi-core processor MCP must be stopped when the first frequency fcor1 is changed to the second frequency fcor2 or the second frequency fcor2 is changed to the first frequency fcor1 until a frequency to be changed is fixed (e.g., stabilized).

Therefore, the change in a lower voltage or a frequency causes an operation delay of the multi-core processor MCP. However, the task scheduling method of the present embodiment reduces the number of times operating voltages of the first core C01 and the second core C02 of the multi-core processor MCP are changed, thereby minimizing deterioration of system performance. This will be described in more detail below.

Figure 6:
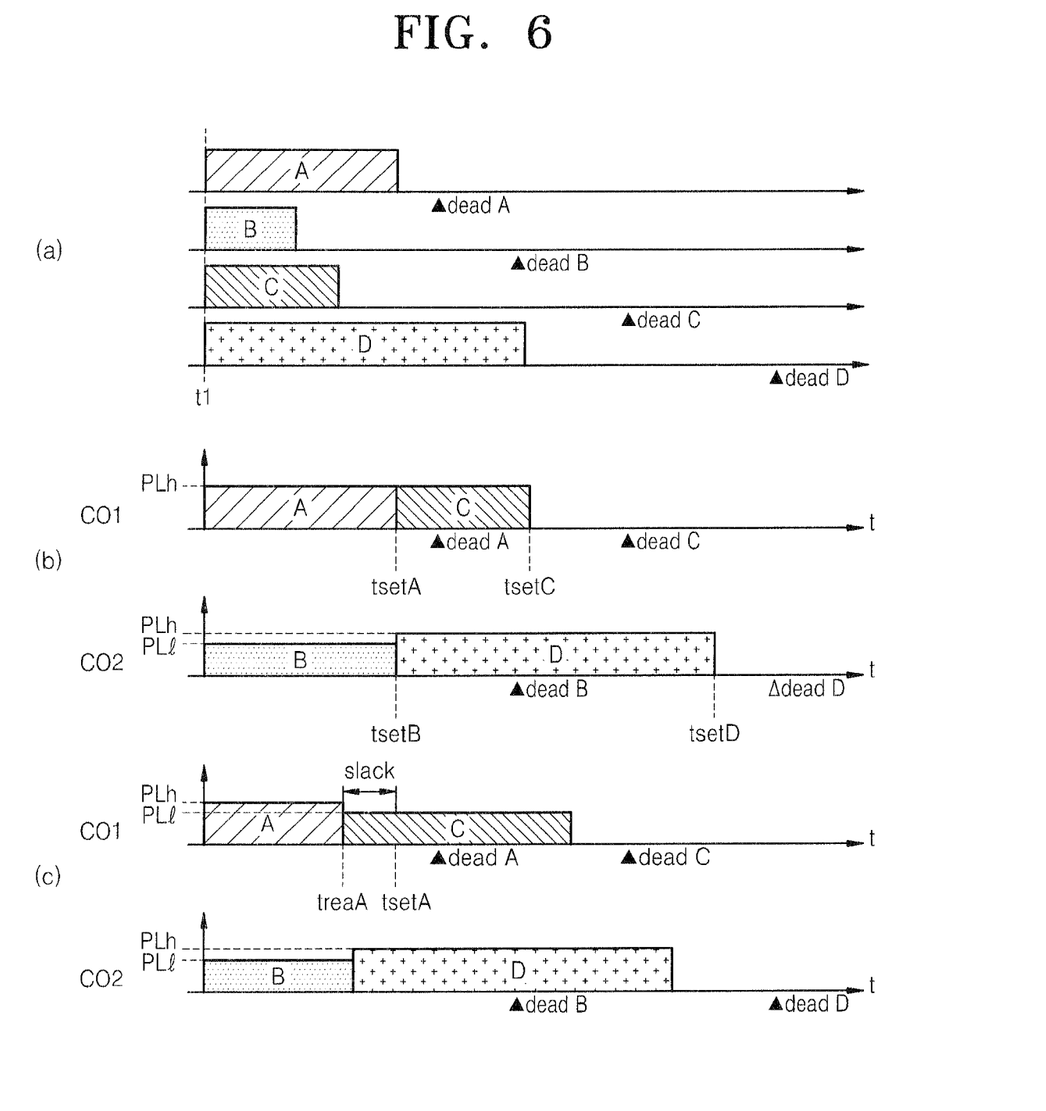
FIGS. 6 and 7 are diagrams of examples of the task scheduling method of FIG. 1 according to an exemplary embodiment of the inventive concept.

FIGS. 6(a) through 6(c) are diagrams of examples of the task scheduling method according to an exemplary embodiment of the inventive concept.

Referring to FIGS. 6(a) through 6(c), a time to start each of tasks A, B, C, and D, a processor cycle (e.g., a task processing time) required to complete each of the tasks A, B, C, and D, and a deadline are set for each of the tasks A, B, C, and D. In particular, the tasks A, B, C, and D, which require real-time processing, are performed by the first core C01 and the second core C02.

Referring to FIG. 6(a), the tasks A, B, C, and D can be started at a time t1. The processor cycles (e.g., the task processing time) set for the tasks A, B, C, and D are indicated by rectangular lengths along a temporal axis. The deadlines of the tasks A, B, C, and D are indicated by triangular symbols on the temporal axis. For example, the deadlines of the tasks A, B, C, and D are ▲deadA, ▲deadB, ▲deadC, and ▲deadD.

As described above, if the multi-core processor MCP is required to process the tasks A, B, C, and D in real time, the tasks A, B, C, and D are scheduled in such a way that the deadlines of the tasks A, B, C, and D are all satisfied when the worst case is assumed. For example, the tasks A, B, C, and D are allocated to one of the first core C01 and the second core C02. Referring to FIG. 6(b), the tasks A and C may be allocated to the first core C01 so that the deadline ▲deadA of the task A and the deadline ▲deadC of the task C are satisfied. The tasks B and D may be allocated to the second core C02 so that the deadline ▲deadB of the task B and the deadline ▲deadD of the task D are satisfied.

Figure 4:
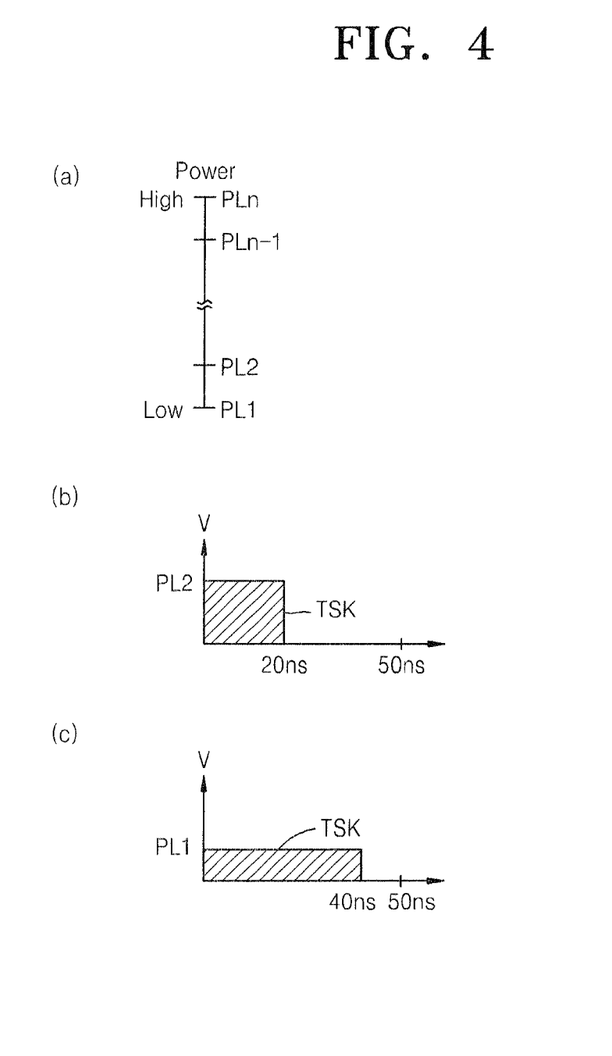
FIGS. 4(a) through (c) are diagrams for explaining power levels of tasks according to an exemplary embodiment of the inventive concept.

Likewise, power levels and processor cycles of the tasks A, B, C, and D are scheduled when the worst case is assumed. For example, when the worst case is assumed, a power level PLh is set for the tasks A, C, and D, and a power level PL1 is set for the task B. Each of the power levels PLh and PL1 may be one of the power levels PL1~PLn of FIG. 4(*a*). However, the power level PLh may have a voltage higher than the power level PL1.

When the worst case is assumed, a processor cycle tsetA is scheduled for the task A, and a processor cycle tsetB is scheduled for the task B. Likewise, a processor cycle tsetC is scheduled for the task C, and a processor cycle tsetD is scheduled for the task D. As described above, the multi-core processor MCP is required to process the tasks A, B, C, and D in real time. Real time processing may mean that the tasks A, B, C, and D are completed before their deadlines ▲deadA, ▲deadB, ▲deadC, and ▲deadD.

However, the tasks A, B, C, and D may actually be processed within a smaller number of processor cycles than the number of the processor cycles set for each task. For example, referring to FIG. 6(*c*), the task A may be processed faster than scheduled as shown in FIG. 6(*b*). In other words, the first core C01 may process the task A for a processor cycle treaA that is smaller than the processor cycle tsetA set for the task A. A time corresponding to a difference between a processor cycle set for a task and an actually used processor cycle is referred to as a slack time. For example, the slack time for the task A is a difference between the processor cycle tsetA set for the task A and the processor cycle treaA actually used to process the task A.

When the slack time exists for one or more tasks of tasks grouped in the same core, scheduling of other tasks may be updated. When the slack time for some tasks exists, processor cycles set for other tasks may be increased by the slack time. For example, in FIG. 6(*c*), when the slack time for the task A exists among the tasks A and C allocated to the first core C01, the processor cycle set for the task C increases by the slack time for the task A.

As described with reference to FIGS. 4(*b*) and 4(*c*), a reduction in power levels of tasks may result in a reduction in the power consumption of cores although a task processing time increases. Thus, the task C of FIG. 6(*c*) may be rescheduled by reducing the power level of the task C, which has the increased processor cycle corresponding to the slack time, to reduce the power consumption of the first core C01. In FIG. 6(*c*), the power level of the task C is changed from the power level PLh to the power level PL1.

As further shown in FIG. 6(*c*), the task B allocated to the second core C02 is processed at a processor cycle shorter than the set processor cycle tsetB, and thus the task D may be rescheduled. The power level of the task D may be the same as the power level PLh of the task A. However, if the power level of the task D is reduced in FIG. 6(*c*), the task D may not be processed within the deadline ▲deadD for the task D, and thus the task D may not be rescheduled. In this case, the second core C02 processes the task D by changing an operating voltage from the power level PL1 of the task B to the power level PLh of the task D (see e.g., FIG. 5) by DVFS.

When the power level of the task C is changed, as described with reference to FIG. 5, the first core C01 or the multi-core processor MCP stops operating. To prevent deterioration of system performance, the task scheduling method according to the present embodiment moves a task whose power level is to be changed to a core operating at the power level to be changed as shown in FIG. 3.

Figure 8:
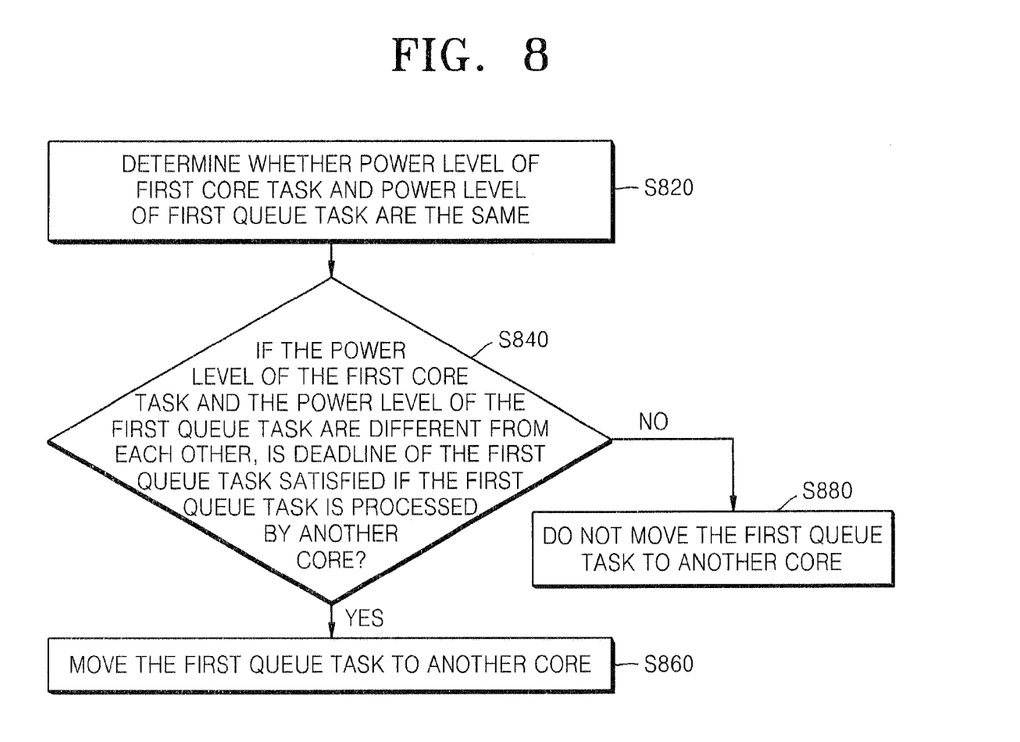
FIGS. 8 and 9 are flowcharts of task scheduling methods according to exemplary embodiments of the inventive concept.

However, the task scheduling method according to the present embodiment moves the task whose power level is to be changed under the condition of satisfying the deadline of each task. Referring to FIG. 8, if a power level of a task, for example, the task C, is different from that of the first core C01 (operation S820), the task C is moved to the second core C02 (operation S860) as long as the task C may be processed within the deadline ▲deadC (operation S840 YES). However, if the task C may not be processed within the deadline ▲deadC (operation S840 NO), the task C is not moved to the second core C02 (operation S880).

Referring to FIGS. 3 and 6, the first core task CTSK1 of the first core C01 of FIG. 3 may be the task A of FIG. 6, and the second core task CTSK2 of the second core C02 may be the task B of FIG. 6. The first queue task QTSK1 stored in the first queue QUE1 that is first scheduled to be processed by the first core C01 of FIG. 3 may be the task C of FIG. 6. The second queue task QTSK2 stored in the second queue QUE2 that is first scheduled to be processed by the second core C02 of FIG. 3 may be the task D of FIG. 6. The first scheduling described with reference to FIG. 3 corresponds to FIG. 6(*b*). FIG. 6(*c*) corresponds to the second scheduling described with reference to FIG. 3.

The task scheduling method according to the present embodiment processes a task in a multi-core processor supported by DVFS in real time, and prevents a holding time due to a change in a power level of the task by reducing the number of times an operating voltage of the multi-core processor is changed, thereby enhancing system performance.

The task scheduling method according to the present embodiment also reschedules (e.g., second schedules) a task by increasing a time it takes to process the task by the slack time of a prior task and reducing the power level of the task for this extended period, thereby further reducing power consumption.

Figure 7:
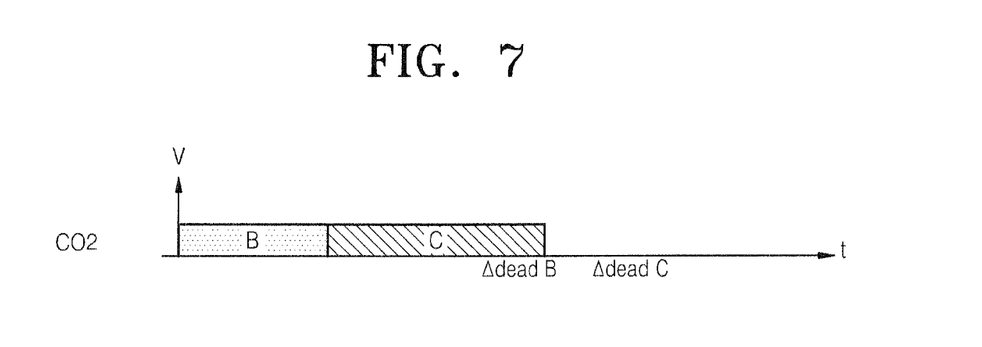

Referring to FIG. 6, if the task C is second scheduled to the second core C02, the task D that is first scheduled to be processed by the second core C02 may be required to be second scheduled. In other words, referring to FIG. 7, the second core C02 processes the task B and then processes the task C that is second scheduled to the same power level PL1 as that of the task B, and thus if the operating voltage of the second core C02 is not changed, the task D is moved from the second queue QUE2 of FIG. 3.

Figure 9:
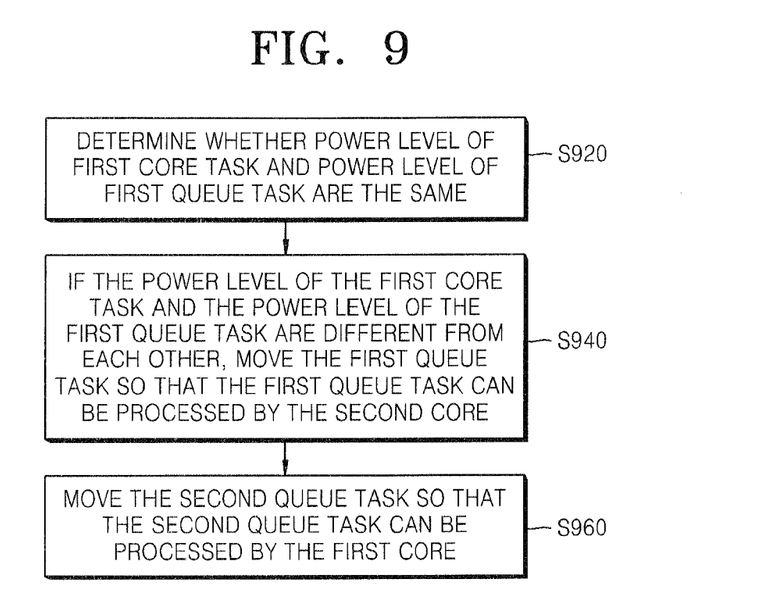

Referring to FIG. 9, the task scheduling method according to the present embodiment may include determining whether the first core task CTSK1 and the first queue task QTSK1 have the same power level (operation S920), moving the first queue task QTSK1 to be processed by the second core C02 if the first core task CTSK1 and the first queue task QTSK1 have different power levels (operation S940), and moving the second queue task QTSK2 to the first core C01 (operation S960).

Figure 10:
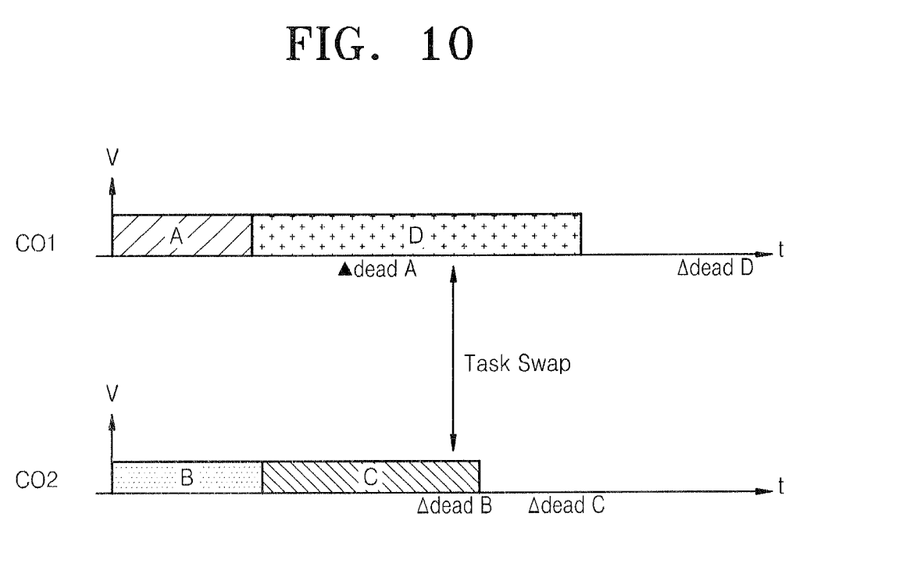
FIG. 10 is a diagram of an example of the task scheduling method of FIG. 9 according to an exemplary embodiment of the inventive concept.

In other words, to prevent a change in the operating voltage of the first core C01 due to the first queue task QTSK1 having a different power level than the first core task CTSK1, if the operating voltage of the second core C02 (e.g., the power level of the second core task CTSK2) is the same as the power level of the first queue task QTSK1, and if the power level of the first core task CTSK1 is the same as that of the second queue task QTSK2, a swap operation of moving the first queue task QTSK1 to the second queue QUE2 and simultaneously moving the second queue task QTSK2 to the first queue QUE1 may be performed. As a result, the task D of FIG. 6(*c*) may be second scheduled to be processed by the first core C01 as shown in FIG. 10.

Figure 11:
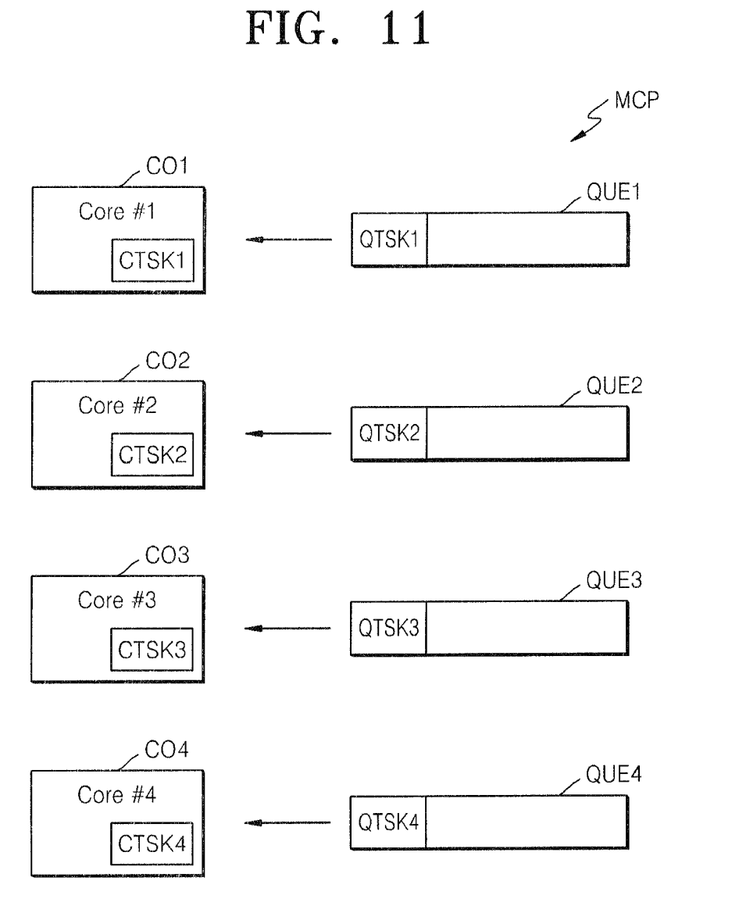
FIG. 11 is a diagram of a multi-core processor according to an exemplary embodiment of the inventive concept.

The task scheduling method according to the present embodiment is described above when the multi-core processor MCP includes the two cores C01 and C02. However, the inventive concept is not limited thereto. Referring to FIG. 11, the task scheduling method according to the present embodiment may apply to a multi-core processor MCP having four cores C01 through C04. The four cores C01 through C04 may respectively include queues QUE1 through QUE4 that store tasks QTSK1 through QTSK4 scheduled to be processed by the cores C01 through C04. The four cores C01 through CO4 may have the same structures as and operate in the same manner as the first core C01 and the second core C02 of FIG. 3, and thus detailed descriptions thereof will be omitted here.

Figure 12:
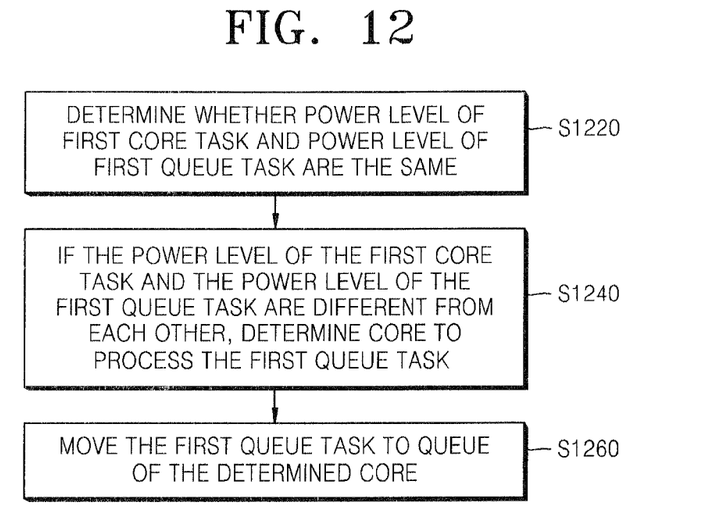
FIG. 12 is a flowchart of a task scheduling method according to an exemplary embodiment of the inventive concept.

The task scheduling method according to an exemplary embodiment of the present inventive concept may also apply to a multi-core processor that includes any number of cores. In this case, referring to FIG. 12, the task scheduling method may include determining a core of a plurality of cores to process a task (operations S1220 and S1240), e.g., finding a core operating at the same operating voltage as an operating voltage of the task, and moving the task to a queue of the determined core (operation S1260), thus preventing the operating voltage of the core from changing. The task scheduling method of the present embodiment may increase a probability of moving a task as the number of cores increases.

Figure 13:
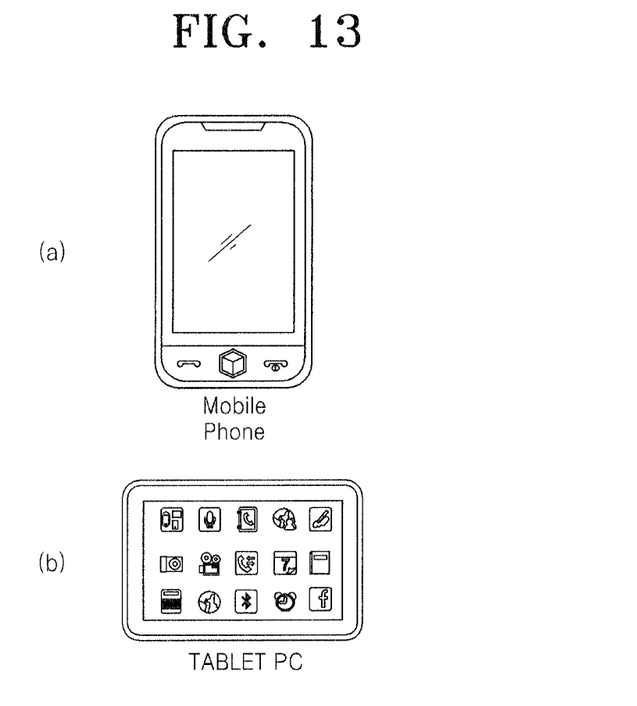
FIG. 13 illustrates a mobile device according to an exemplary embodiment of the inventive concept.
Figure 14:
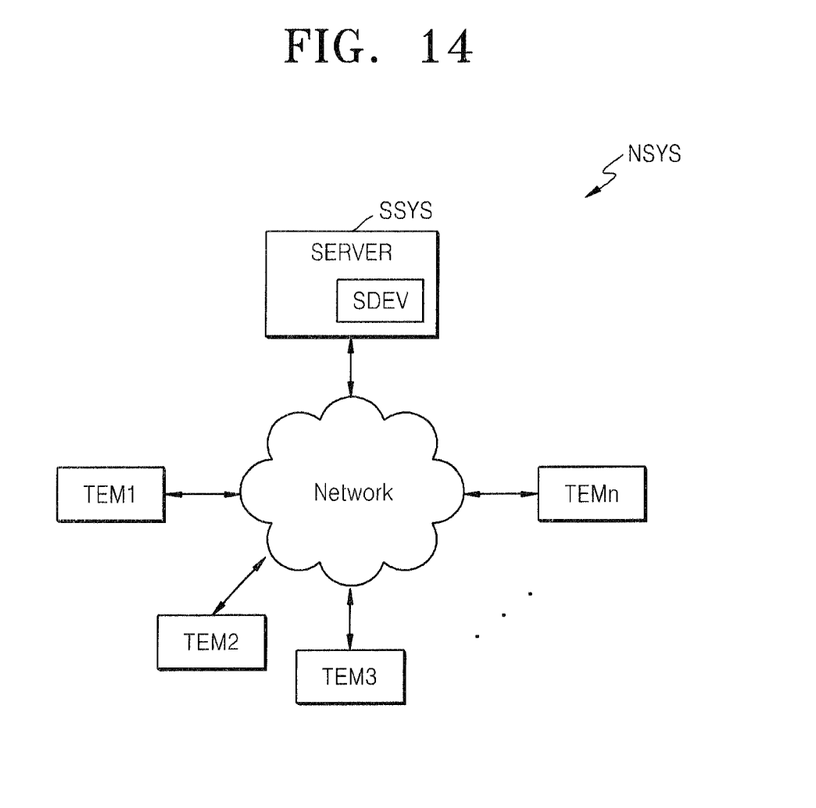
FIG. 14 illustrates a network system and a server system according to an exemplary embodiment of the inventive concept.

The semiconductor device SDEV of FIG. 2 that operates using the task scheduling method of FIG. 1 may be included in a mobile device of FIG. 13 like a mobile phone or a tablet PC. Alternatively, referring to FIG. 14, in a network system NSYS including a plurality of terminals TEM1~TEMn connected over a network and a server system SSYS including a server SERVER that processes a request received from the terminals TEM1~TEMn, the semiconductor device SDEV of FIG. 2 that operates using the task scheduling method of FIG. 1 may be included in the server SERVER.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A task scheduling method of a semiconductor device, the method comprising:
    determining whether a power level of a first queue task disposed in a first place of a first queue and a power level of a first core task are the same as each other, wherein the first queue task is to be processed by a first core after the first core task;
    in response to the power level of the first queue task and the power level of the first core task being different, moving the first queue task to a second queue, wherein the second queue corresponds to a second core that processes a second core task having the same power level as that of the first queue task, wherein a power level of a second queue task disposed in the second queue is the same as the power level of the first core task; and
    moving the second queue task to the first place of the first queue while the first queue task is moved to the second queue.

2. The method of claim 1, wherein the first queue task is moved to the second queue in response to a determination that the first queue task satisfies a deadline for the first queue task when the second core processes the second core task and then the first queue task.

3. The method of claim 1, further comprising: in response to a determination that the first queue task does not satisfy a deadline for the first queue task when the second core processes the second core task and then the first queue task, changing an operating voltage of the first core from the power level of the first core task to the power level of the first queue task by dynamic voltage frequency scaling (DVFS).

4. The method of claim 1, wherein the first queue task is disposed at the head of the first queue.

5. The method of claim 1, wherein the second queue task is moved to the first queue in response to a determination that the second queue task satisfies a deadline for the second queue task when the first core processes the first core task and then the second queue task.

6. The method of claim 1, further comprising: selecting the second core from among a plurality of cores included in the semiconductor device, in response to a determination that the second core task and the first queue task have the same power level.

7. The method of claim 1, further comprising changing the power level of the first queue task to be different from the power level of the first core task by increasing a processing time of the first queue task based on a slack time, wherein the slack time is a difference between a processing time scheduled for the first core task and the actual time taken to process the first core task.

8. The method of claim 1, wherein the semiconductor device is included in a mobile device or a server.

9. A task scheduling method of a semiconductor device comprising a first core and a second core, the method comprising:
    allocating a first task to be processed by the first core and a second task to be processed by the second core, wherein the first and second cores operate at different power levels; and
    in response to a determination that a power level of the first task is the same as the power level of the second core and a power level of the second task is the same as the power level of the first core, swapping the first and second tasks so that the first task is to be processed by the second core and the second task is to be processed by the first core, wherein the swapping includes removing the first task from a first place of a first queue and placing the first task in a second queue, removing the second task from the second queue and placing the second task in the first place of the first queue while the first task is being placed in the second queue.

10. The method of claim 9, wherein the first and second tasks are swapped in response to a determination that deadlines for the first and second tasks are satisfied by, the second and first cores, respectively.

11. The method of claim 10, wherein a holding operation is not performed by the first and second cores when the first and second tasks are swapped, wherein the holding operation occurs when operating voltages of the first core and the second core are changed to match a power level of the originally allocated tasks.

12. The method of claim 9, further comprising; not swapping the first and second tasks in response to a determination that deadlines for the first and second tasks are not satisfied by the second and first cores, respectively, and changing the operating voltages of the first core and the second core by dynamic voltage frequency scaling (DVFS).

13. The method of claim 9, wherein the semiconductor device further comprises: the first queue for storing the task to be processed by the first core; and the second queue for storing the task to be processed by the second core.

14. A task scheduling method of a semiconductor device, the method comprising:

determining if a power level of a first task disposed at a first place in a first queue is the same as an operating voltage of a first core;

in response to a determination that the power level of the first task and the operating voltage of the first core are different, preventing the operating voltage of the first core from changing, wherein the operating voltage of the first core is prevented from being changed by moving the first task into a second queue of a second core; and moving a second task from the second queue to the first place in the first queue while the first task is moved to the second queue, in response to a determination that a power level of the second task is the same as the operating voltage of the first core.

15. The method of claim 14, wherein an operating voltage of the second core is the same as the power level of the first task.

16. The method of claim 14, wherein the first task is moved into the second queue in response to a determination that a deadline of the first task will be satisfied by the second core.

* * * * *